United States Patent [19]

Imura

[11] 4,205,906

[45] Jun. 3, 1980

[54] AUTO-FOCUS CAMERA CIRCUITRY

[75] Inventor: Toshinori Imura, Sakai, Japan

[73] Assignee: Minolta Camera Kabushiki Kaisha, Osaka, Japan

[21] Appl. No.: 15,742

[22] Filed: Feb. 27, 1979

[30] Foreign Application Priority Data

Mar. 13, 1978 [JP] Japan .............................. 53-28971

[51] Int. Cl.² ........................... G03B 3/00; G03B 7/08
[52] U.S. Cl. ....................................... 354/25; 354/195
[58] Field of Search ........................... 354/25, 195–202

[56] References Cited

U.S. PATENT DOCUMENTS

| 3,442,193 | 5/1969 | Pagel .................................. 354/53 X |
| 3,875,580 | 4/1975 | Watanabe et al. ............... 354/202 X |
| 4,031,383 | 6/1977 | Hosoe et al. ........................ 354/25 X |

Primary Examiner—L. T. Hix
Assistant Examiner—Thomas H. Tarcza
Attorney, Agent, or Firm—Watson, Cole, Grindle & Watson

[57] ABSTRACT

An auto-focus camera includes a first signal circuit for generating a first control signal only when the battery voltage exceeds a minimum permissible level for normal operation of an electric range finder and an exposure control circuit, and a second signal circuit for generating a second control signal only when the range finder has reached a stable operating state after commencement of electric power supply thereto. The existence of both the first and second control signals enables an electromagnet provided in an exposure control circuit for arresting the camera shutter in an open state to hold an engaging member out of the locus of movement of a corresponding engaging member provided on a trigger member. The trigger member can be manipulated to a terminal position for allowing operation of a focus adjusting device unless the engaging members engage one another, and the range finder is supplied with electric power from the battery during the course of the manipulation of the trigger member. The camera shutter is opened in response to the termination of the automatic focus adjustment.

5 Claims, 3 Drawing Figures

AUTO-FOCUS CAMERA CIRCUITRY

BACKGROUND OF THE INVENTION

1. Field of the Invention

The present invention relates to an auto-focus camera including an electric exposure control device.

2. Prior Art

Most electric exposure controlled cameras are generally constructed such that camera release is prevented when the power voltage applied to the electric exposure control device is detected by a battery check circuit to have decreased to a potential at which normal exposure control operation is not guaranteed, as disclosed in U.S. Pat. No. 3,875,580.

Moreover, auto-focus cameras generally include an electric range finder for the range finding of an object, and when the power voltage applied to such a range finder declines to a potential at which normal circuit operation is not assured, the camera release is preferably made impossible to prevent an erroneous focus adjustment, as disclosed in U.S. Pat. No. 3,442,193. Additionally, prior art range finder devices permit no stable circuit operation immediately after the power has been applied, due to a delayed response to the photoelectric element receiving light from an object and an equivalent capacitance inherent in the circuit. It actually takes some time for the circuit operation to become stable, thus guaranteeing no correct focus adjustment only on condition that the power voltage is at sufficient potential.

SUMMARY OF THE INVENTION

Accordingly, the primary object of the present invention is to provide an auto-focus camera which prevents the camera release operation under the action of a preventing means when power voltage levels at an exposure control circuit and a range finder included in an auto-focus device are lower than those specified for guaranteed normal operation of the respective circuits, or before the range finger operation becomes stable with power applied to the range finder, thereby preventing any incorrect focus adjustment and exposure operation.

Another object of the present invention is to provide an auto-focus camera which disables the preventing means by a releasing means utilizing an electromagnet included in the exposure circuit for use in controlling the shutter closing member when the power voltage is above the specified potential and after the range finder operation becomes stable, thereby enabling camera release operation.

To accomplish these objects, an auto-focus camera of the present invention is constructed such that focus adjustment and shutter release is made possible when the battery voltage exceeds a minimum permissible level for normal operation of range finder means and an exposure control circuit, and when the range finder means has reached a stable operating state after commencement of electric power supply thereto. More particularly, focus adjusting means responsive to a distance signal from the range finder means sets an objective lens at a position where the objective is focused on an aimed object. The focus adjusting means is allowed to operate when a manually operable trigger member is manipulated from an initial position to a terminal position, but means are provided to prevent the trigger member from reaching the terminal position. A first signal circuit generates a first control signal only when the battery voltage exceeds the minimum permissible level while a second signal circuit generates a second control signal only when the range finder means has reached the stable operating state. Under existence of both the first and second control signals, a retaining means retains the preventing means at an inoperative position so that the trigger member is allowed to be manipulated to the terminal position. The electric power supply to the range finder means is effected by a switch actuated by the trigger member before the trigger member allows the operation of the focus adjusting means, and the camera shutter is released to open by means responsive to termination of the setting of the objective lens by the focus adjusting means.

With the above construction, if the battery voltage has fallen beyond the minimum permissible level, or if the range finder means has not reached the stable operating state, the retaining means cannot retain the preventing means at the inoperative position and thus the preventing means prevents the trigger member from being manipulated to the terminal position. Then, the focus adjusting means cannot be allowed to operate and the shutter cannot be released to open. Hence, accidental photographing with erroneous focus adjustment and exposure due to insufficient battery voltage and unstable operation of the range finder means is prevented.

According to a preferred embodiment of the present invention, the retaining means and the exposure control circuit commonly includes a single electromagnet energized with the existence of the first and second control signals. The energized electromagnet retains the preventing means at the inoperative position and causes an arresting member to arrest the shutter at an opened position. The retaining means includes a switching element for controlling the electric power supply to the exposure control circuit and a logic circuit having a pair of input terminals connected to the first and second signal circuits, respectively, and generating an output rendering the switching element conductive when the first and second control signals are fed to the input terminals. The common use of the electromagnet for the retaining means and for the exposure control circuit reduces the number of parts and provides a simple and reasonable construction.

The above and other objects and features of the present invention will become more apparent from the following description taken in connection with the accompanying drawings.

DESCRIPTION OF THE PREFERRED EMBODIMENT

Figure 1:
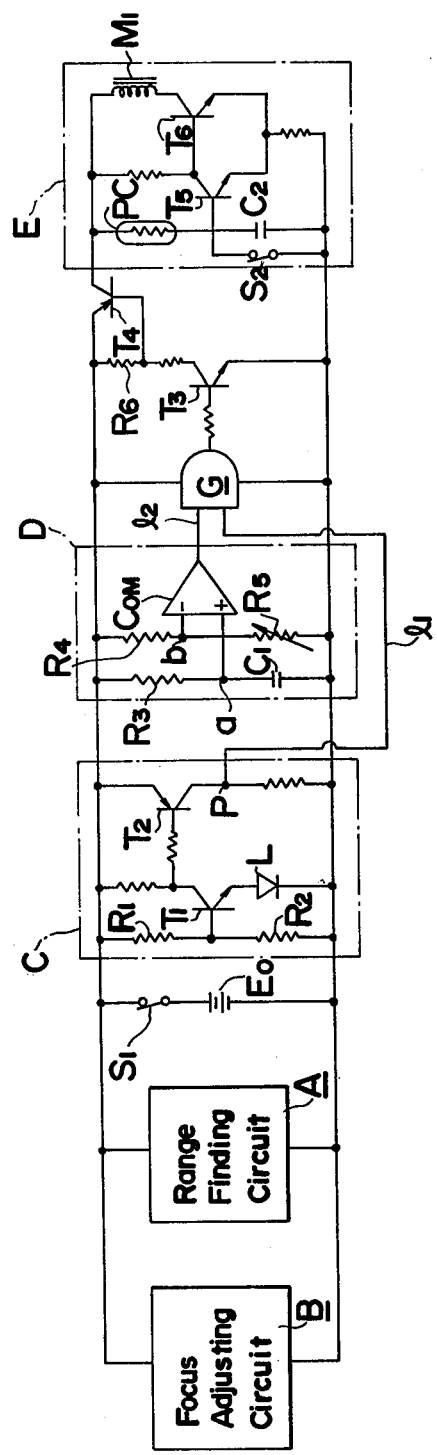
FIG. 1 is an electric circuit diagram of one embodiment of the present invention.

Referring to FIG. 1, which shows an electric circuit diagram of an auto-focus camera according to one embodiment of the present invention, a known range finder circuit A detects the distance from the camera to an object and is connected to battery E0 when switch S1 is closed. Range finder circuit A may be of the type disclosed in U.S. Pat. No. 3,945,023 and does not reach stable operation immediately after switch S1 is closed, but requires some time before reaching its stable operating condition.

There are also shown in FIG. 1 battery check circuit C, timer circuit D and automatic exposure control circuit E. Battery check circuit C is equipped with resistors R1 and R2 forming a bleeder circuit, transistors T1 and T2 constituting a switching circuit, and light emitting diode L for display. Resistors R1 and R2 are set so that transistor T1 may turn on only when battery E0 maintains its voltage at a potential at which both range finder circuit A and automatic exposure control circuit E operate properly. When the voltage at battery E0 decreases to a potential at which either range finder circuit A or automatic exposure control circuit E is not guaranteed for normal operation, transistor T1 is kept off. With transistor T1 turned on, light emitting diode L lights and, at the same time, transistor T2 turns on to provide a high level output at output terminal P of battery check circuit C.

Timer circuit D includes resistor R3 forming a time constant circuit with capacitor C1, resistors R4 and R5 constituting a bleeder circuit, and comparator COM. The plus (non-inverting) input terminal and minus (inverting) input terminal of comparator COM are connected to node a of resistor R3 and capacitor C1, and node b of resistor R4 and resistor R5, respectively. The output of comparator COM switches to a high level only when the potential at node a is higher than that at node b. The time constant of the time constant circuit comprising resistor R3 and capacitor C1 is set according to the time required for range finder circuit A to reach stable operation. In other words, with switch S1 closed, capacitor C1 is charged, causing the potential at node a to gradually increase to a level that is lower than the potential at node b before the operation of range finder circuit A is stabilized and, as a result, the output of comparator COM switches to a high level simultaneously with or after the operation of range finder circuit A becomes stable.

The paired input terminals of AND circuit G are connected through output lines 11 and 12 to output terminal P of battery check circuit C and the output terminal of comparator COM, respectively. Connected to the output terminal of AND circuit G is the base of transistor T3 which turns on when the output of AND circuit G is a high level. Transistor T4 constitutes a power supply switch for automatic exposure control circuit E, and resistor R6 connected to the collector of transistor T3 is inserted between the base and emitter of transistor T4, which turns on when transistor T3 turns on to provide a potential across resistor R6.

Automatic exposure control circuit E comprises photoconductive element PC constituting a time constant circuit with capacitor C2, transistors T5 and T6 forming a switching circuit, count switch S2 and electromagnet M1. Count switch S2 is opened simultaneously with the start of the shutter opening operation and is closed at a proper time after exposure, as described later. When count switch S2 is opened while transistor T4 remains on, capacitor C2 is charged commensurate with the resistance of photoconductive element PC, i.e. the scene brightness. When the potential across the terminal of capacitor C2 reaches a predetermined level, transistor T5 turns on. In the meantime, transistor T6 is connected such that it turns on simultaneously when transistor T4 turns on and turns off simultaneously when transistor T5 turns on, and electromagnet M1 is actuated only when transistor T6 is on.

Figure 2:
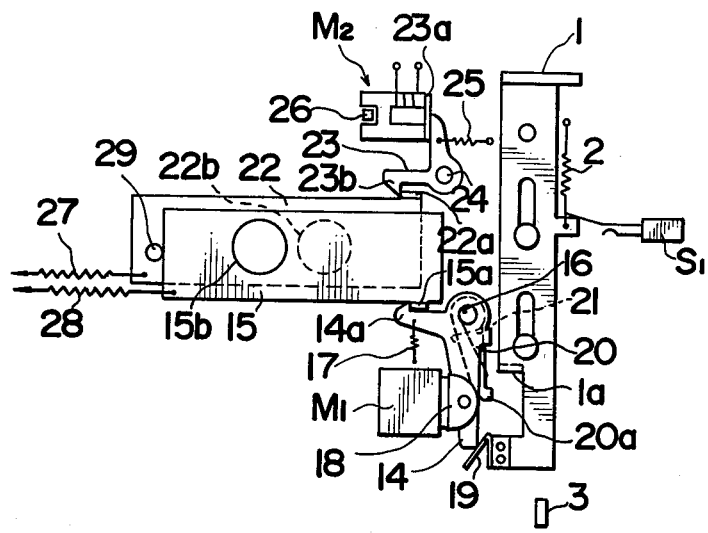
FIG. 2 is a front view of a mechanical part of the embodiment.
Figure 3:
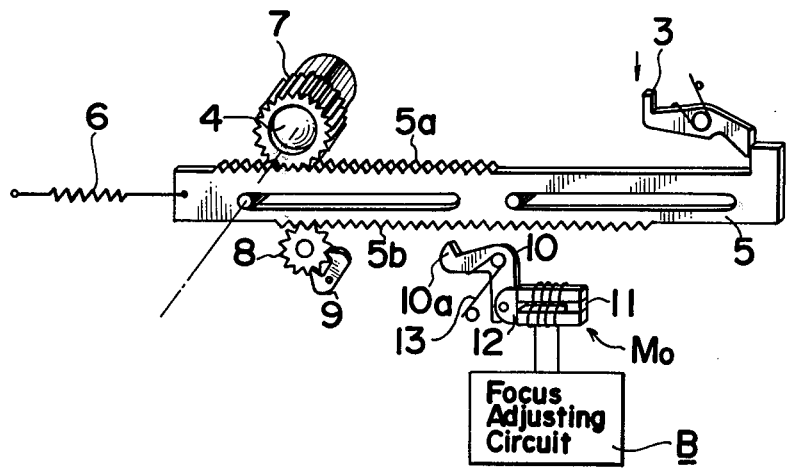
FIG. 3 is a perspective view of another mechanical part of the embodiment.

Referring now to FIGS. 2 and 3, which show the mechanical parts of the present embodiment, depression of release operating member 1 in FIG. 2 down against the action of spring 2 closes switch S1. Release actuating member 3 starts the shift of objective lens 4 shown in FIG. 3, and when release operating member 1 is pressed down to its final stroke, release actuating member 3 rotates counterclockwise, as shown in FIG. 3, thus releasing drive member 5 from its restrained condition. When released from its restrained position, drive member 5, which is shown in FIG. 3 at its charged condition, is moved leftward by spring 6 to rotate gear 7 engageable with rack 5a formed on drive member 5, driving objective lens 4 towards the film side (not shown). When drive member 5 is restrained at its charged position, objective lens 4 is set so that it is focused on an object at the closest distance, with objects at far distances in accordance with the leftward travel of drive member 5.

Gear 8 engages another rack 5b formed on drive member 5 and is damped by ankle 9. Stop lever 10 stops the drive of objective lens 4 when brought to the in-focus position for an object at which objective lens 4 is aimed. For example, when set to the shown position by the shutter charging operation to be described later, stop lever 10 is usually attracted together with armature 12 to the core of electromagnet MO through the action of permanent magnet 11 provided on electromagnet MO. However, when electromagnet MO is actuated by the signal indicative of an in-focus condition or in-focus signal from focus adjusting circuit B and the force of permanent magnet 11 is offset by that of electromagnet MO, stop lever 10 is rotated clockwise by spring 13 to allow pawl 10a to engage rack 5b, whereby drive member 5 is stopped from traveling to the left. Focus adjusting circuit B compares the distance signal from range finder circuit A with a signal from a circuit (not shown) which detects the shift position of objective lens 4 for the issuance of an in-focus signal when objective lens 4 is driven to a position where the object is brought into focus.

Stop lever 14 holds shutter closing member 15 at a charged position, and includes pawl 14a engageable with angled projection 15a of shutter closing member 15, and is also biased counterclockwise by spring 17 around shaft 16. Armature 18 to be attracted to the core of electromagnet M1 is provided on stop lever 14. Leaf spring 19 mounted at the bottom end of release operating member 1 constitutes a resetting means for armature 18 and stop lever 14. While pressing stop lever 14 to rotate it clockwise against the action of spring 17 and returning stop lever 14 to its restrained position, leaf spring 19 presses armature 18 against the core of electromagnet M1 when release operating member 1 is returned by spring 2 to its elevated position.

Additionally, block lever 20 blocks release operating member 1 from being pressed down, and is coaxially supported on the same shaft with stop lever 14 and is connected thereto by spring 21. Therefore, block lever 20 is rotatable together with stop lever 14, and pawl 20a at the tip of block lever 20 fits into the path of indentation 1a on release operating member 1 when block lever 20 is rotated counterclockwise. In other words, FIG. 2 shows an inoperative position of block lever 20, while the engagement of pawl 20a with indentation 1a is an operative position thereof.

Electromagnet M2 included in an electromagnetic release circuit (not shown) serves to release shutter opening member 22 and is actuated, for example, in response to the in-focus signal from focus adjusting circuit B with a slight delay after issuance thereof, when the drive of objective lens 4 into an in-focus position has been completed. Stop lever 23 for shutter opening member 22 is biased clockwise by spring 25 around shaft 24. However, since armature 23a on the arm of stop lever 23 is attracted by the force of permanent magnet 26 to the core of electromagnet M2 after the shutter has been charged, stop lever 23 is engaged with projection 22a of shutter opening member 22 by pawl 23b.

It should be understood that shutter opening member 22 and shutter closing member 15 are biased by springs 27 and 28 to the left, as shown in FIG. 2 and the shutter opening is formed by means of openings 22b and 15b when shutter opening member 22 travels to the left. The shutter opening is closed when shutter closing member 15 travels to the left. Furthermore, pin 29 carried by shutter opening member 22 is arranged to charge shutter closing member 15 in response to the charging of shutter opening member 22, serving at the same time to hold shutter closing member 15 in its charged position when shutter closing member 15 is released from its restrained condition by stop lever 14 while shutter opening member 22 remains restrained by stop lever 23.

With the above construction, when battery EO is used up with the voltage lowered to a potential at which either range finder circuit A or automatic exposure control circuit E does not operate properly, transistors T1 and T2 are maintained off, causing the output at output terminal P to be a low level even if switch S1 is closed at an initial pressing stage of release operating member 1, thereby permitting AND circuit G to provide a low level output by which transistors T3 and T4 remain turned off. As a result, electromagnet M1 is deenergized, allowing leaf spring 19 to retract to a lower position as release operating member 1 is lowered, and at the same time, stop lever 14 and block lever 20 are rotated together by the action of spring 17 counterclockwise, with pawl 20a on block lever 20 engaging indentation 1a of release operating member 1 then in a lowering motion, whereby release operating member 1 is prevented from lowering any further. At this point, release operating member 1 does not press release actuating member 3 with drive member 5 remaining restrained at a charged position, whereby objective lens 4 is not driven. Therefore, any erroneous photography, i.e. incorrect in-focus adjustment or exposure operation due to used battery EO may be prevented.

It is to be noted that shutter closing member 15 is released from its restrained condition by the counterclockwise rotation of stop lever 14 and shutter closing member 15, in this case, is held by pin 29 in its charged position. When release operating member 1 is returned to its elevated position, stop lever 14 is reset by leaf spring 19, causing shutter closing member 15 to be restrained again by stop lever 14.

When the voltage of battery EO is at a sufficient potential to guarantee the normal operations of range finder circuit A and automatic exposure control circuit E, transistors T1 and T2 turn on and light emitting diode L lights upon closure of switch S1 by the depression of release operating member 1, indicating that battery EO has not been used up and, at the same time, a high level output at output terminal P is transmitted to one of the input terminals of AND circuit G. In the meantime, power is supplied to range finder circuit A and timer circuit D by the closing of switch S1. However, the output of comparator COM is a low level before range finder circuit A reaches its stable operation immediately after switch S1 has been closed, causing the output of AND circuit G to be maintained at a low level and transistors T3 and T4 to remain turned off. Accordingly, even if release operating member 1 is rapidly depressed, block lever 20 blocks release operating member 1 from being depressed to its final stroke, whereby camera release is not carried out.

Contrary to the above, when release operating member 1 is lowered at a relatively slow speed, range finder circuit A is shifted to its stable operating condition during the depression of release operating member 1, and generates a distance signal commensurate with the distance to an object. Simultaneously with the stable operation of range finder circuit A, or a slight delay thereafter, the potential across the terminal of capacitor C1, i.e. the potential at node a exceeds that at node b, and the output of comparator COM is shifted to a high level as well, and thus AND circuit G provides a high level output. This causes transistors T3 and T4 to turn on, commencing the power supply to automatic exposure control circuit E and with transistor T6 turned on to actuate electromagnet M1.

As a result, armature 18 is attracted to the core of electromagnet M1, causing stop lever 14 to be held at its restrained position shown in FIG. 2 to continue the restraint of shutter closing member 15 even after leaf spring 19 has retracted to its lower position in association with the depression of release operating member 1. Since block lever 20 is also held in its inoperative position shown in FIG. 2, release operating member 1 can be depressed to its final stroke without being prevented by block lever 20, causing release actuating member 3 to be pressed clockwise (as shown in FIG. 3) by which drive member 5 is released from its restrained condition.

As a result, drive member 5 is moved leftward by the action of spring 6, as shown in FIG. 3, thereby driving objective lens 4. When objective lens 4 is driven to the in-focus position for an object at which objective lens 4 is aimed, electromagnet MO is actuated by the in-focus signal from focus adjusting circuit B, whereby stop lever 10 is rotated clockwise to engage rack 5b, so that drive member 5 is stopped at a position where objective lens 4 is focused on an aimed object. Upon termination of this setting of objective lens 4, electromagnet M2 is actuated, and when the force of permanent magnet 26 is offset by that of electromagnet M2, stop lever 23 is rotated clockwise by spring 25 to disengage pawl 23b from projection 22a, causing shutter opening member 22 to be moved leftward by spring 27, whereby exposure of the film (not shown) commences.

Meanwhile, switch S2 is opened simultaneously with the start of travel of shutter opening member 22. Capacitor C2 is then charged at a rate commensurate with the resistance of photoconductive element PC, i.e. a scene brightness, and when the potential of capacitor C2 reaches a predetermined level, transistor T5 turns on while transistor T6 turns off. As a result, electromagnet M1 is deenergized, causing stop lever 14 to rotate counterclockwise by spring 17, thereby releasing projection 15a from its restrained position by pawl 14a. This causes shutter closing member 15 to be moved leftward by spring 28 to complete the exposure of the film. It should be noted that the counterclockwise rotation of stop lever 14 rotates block lever 20 in the same direction and since release operating member 1 is already depressed to its final stroke at this point, pawl 20a only abuts the upper side edge of projection 1a on release operating member 1. However, even when block lever 20 is stopped thereby from rotating counterclockwise, stop lever 14 is further rotated towards a counterclockwise direction under the force of spring 17.

The embodiment as has been described above is not limited to the modes of operation set forth above. In the construction of the above embodiment, for example, focus adjusting circuit B issues a signal only when objective lens 4 is driven to an in-focus position, and the drive of objective lens 4 is forcibly stopped in response to the signal. However, a so-called servo type focus adjusting device may be utilized instead. In other words, focus adjusting circuit B may be constructed, in this case, such that it compares the distance signal from range finder circuit A with a signal from a circuit (not shown) which detects the shifted position of objective lens 4 to produce an output commensurate to the difference between the signals, and a drive motor is rotated according to the output thus produced to control the position of objective lens 4.

The auto-focus camera according to the above described embodiment uses an electromagnet included in an exposure control circuit for controlling a shutter closing member and also for camera release operation control and is constructed so that it may enable camera release only when the power voltage is sufficient enough to guarantee the normal operations of both a range finder circuit and an exposure control circuit, and only when the operation of the range finder circuit is stabilized after the power thereto has been turned on. This rational and simple construction prevents camera release operation when the power voltage is decreased to a potential at which either the range finder circuit or exposure control circuit does not operate properly, or before the range finder circuit reaches its stable operation, though sufficient in power voltage, the auto-focus camera thus having the advantage that any erroneous photography can be prevented.

As shown in the above embodiment, it is common in an auto-focus camera that focus adjustment is first made by the release operation and the shutter is then released by a signal indicative of the focus adjustment termination. Instead, an auto-focus camera may be constructed such that while starting focus adjustment by the release operation, a timer circuit is simultaneously operated to perform the shutter release by the output from the timer circuit after the lapse of a predetermined delay including the expected time required for focus adjustment to be completed.

What is claimed is:
1. An auto-focus camera comprising:
   an objective lens movable along its optical axis for focus adjustment;
   range finder means for generating a distance signal representative of the distance from said camera to an aimed object;
   focus adjusting means responsive to said distance signal for setting said objective lens at a position where said objective is focused on said aimed object;
   a shutter;
   means for opening said shutter in response to termination of the setting of said objective lens by said focus adjusting means;
   exposure control means including an exposure control circuit having an electromagnet and an arresting member for arresting said shutter in an opened condition under the energization of said electromagnet, the arrestment being released for allowing closing of said shutter upon deenergization of said electromagnet to thereby terminate an exposure;
   a manually operable trigger member movable from an initial position to a terminal position for allowing the operation of said focus adjusting device;
   means for preventing said trigger member from allowing the operation of said focus adjusting means;
   a switch associated with said trigger member to be actuated before said trigger means reaches said terminal position, for supplying electric power from said battery to said range finder means;
   a first signal circuit for generating a first control signal only when the battery voltage exceeds a minimum permissible level for normal operation of said range finder means and said exposure control circuit;
   a second signal circuit for generating a second control signal only when said range finder means has reached a stable operating state after the commencement of the electric power supply thereto; and
   retaining means for retaining said preventing means at an inoperative position with the existence of both of said first and second control signals for enabling the operation of said focus adjusting means.

2. An auto-focus camera as in claim 1, wherein said retaining means includes said electromagnet such that said electromagnet is energized with the existence of both of said first and second signals, said preventing means being retained at said inoperative position due to energization of said electromagnet.

3. An auto-focus camera as in claim 2, further comprising means associated with said trigger member for resetting said retaining means to said inoperative position and said arresting member to an arresting position where said arresting member is capable of arresting said shutter in response to returning movement of said trigger member to said initial position.

4. An auto-focus camera as in claim 1, wherein said second signal circuit includes a timer circuit which starts actuation simultaneously with the electric power supply to said range finder means and generates said second control signal after a lapse of a predetermined time longer than the time required for said range finder means to reach said stable operating state.

5. An auto-focus camera as in claim 2, wherein said retaining means includes a switching element for controlling electric power supply from said battery to said exposure control circuit, and a logic circuit having a pair of input terminals connected to said first and second signal circuits respectively and generating an output rendering said switching element conductive when said first and second control signals are fed to said input terminals.

* * * * *